(12) United States Patent
Zellan et al.

(10) Patent No.: US 8,811,808 B2
(45) Date of Patent: Aug. 19, 2014

(54) CAMERA LENS ASSEMBLY

(71) Applicant: Cooke Optics Limited, Leicester (GB)

(72) Inventors: Les Zellan, Mountain Lakes, NJ (US); Steve Pope, Towcester (GB); Huiyang Wang, Bedford (GB); Ian Sheret, Hitchin (GB)

(73) Assignee: Cooke Optics Limited, Leicester (GB)

( * ) Notice: Subject to any disclaimer, the term of this patent is extended or adjusted under 35 U.S.C. 154(b) by 0 days.

(21) Appl. No.: 14/059,111

(22) Filed: Oct. 21, 2013

(65) Prior Publication Data
US 2014/0147103 A1 May 29, 2014

Related U.S. Application Data

(60) Provisional application No. 61/731,031, filed on Nov. 29, 2012.

(30) Foreign Application Priority Data

Sep. 5, 2013 (GB) .................................. 1315821.7

(51) Int. Cl.
| | |
|---|---|
| *G03B 17/00* | (2006.01) |
| *G03B 17/24* | (2006.01) |
| *G03B 17/14* | (2006.01) |
| *H04N 5/232* | (2006.01) |
| *G03B 17/18* | (2006.01) |

(52) U.S. Cl.
CPC ................ *G03B 17/18* (2013.01); *G03B 17/24* (2013.01); *G03B 17/14* (2013.01); *H04N 5/23203* (2013.01); *G03B 2206/00* (2013.01)
USPC ............................................................ 396/50

(58) Field of Classification Search
USPC ............................................................ 396/50
See application file for complete search history.

(56) References Cited

U.S. PATENT DOCUMENTS

| | | | | | |
|---|---|---|---|---|---|
| 4,964,697 | A | * | 10/1990 | Fuziwara ...................... | 359/700 |
| 5,508,781 | A | * | 4/1996 | Imai et al. .................... | 396/529 |
| 7,899,314 | B2 | * | 3/2011 | Kubo .............................. | 396/55 |
| 7,907,838 | B2 | * | 3/2011 | Nasiri et al. .................. | 396/55 |
| 8,259,182 | B2 | * | 9/2012 | Sato et al. ............... | 348/208.11 |
| 8,339,466 | B2 | * | 12/2012 | Noto et al. ................. | 348/208.6 |
| 2006/0165398 | A1 | * | 7/2006 | Imada ............................ | 396/55 |
| 2010/0053344 | A1 | | 3/2010 | Tsukamoto | |
| 2012/0038783 | A1 | * | 2/2012 | Noto et al. ................. | 348/208.2 |
| 2012/0293675 | A1 | * | 11/2012 | Sato et al. ............... | 348/208.99 |
| 2013/0258275 | A1 | * | 10/2013 | Toner et al. .............. | 351/159.03 |
| 2013/0287381 | A1 | * | 10/2013 | Tsukamoto .................... | 396/53 |

FOREIGN PATENT DOCUMENTS

| | | |
|---|---|---|
| EP | 1686792 A2 | 2/2006 |
| JP | 2011053240 A | 9/2011 |
| JP | 2013015622 A | 9/2011 |

* cited by examiner

*Primary Examiner* — Rodney Fuller
(74) *Attorney, Agent, or Firm* — Epstein Drangel LLP; Robert L. Epstein

(57) ABSTRACT

A camera lens assembly comprising a lens assembly housing and a compound lens and a motion sensor arrangement within the lens assembly housing, wherein the motion sensor arrangement comprises: angular rotation sensors configured to detect angular rotation about three orthogonal axes of rotation; and linear acceleration sensors configured to detect linear acceleration in three orthogonal directions.

15 Claims, 3 Drawing Sheets

CAMERA LENS ASSEMBLY

CROSS-REFERENCE TO RELATED APPLICATIONS

Applicants claim the benefit of provisional patent application Ser. No. 61/731,031 filed Nov. 29, 2012. Priority is claimed to UK patent application number 1315821.7, filed Sep. 5, 2013.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

The present invention relates to a camera lens assembly, and more particularly, but not exclusively, to a cinema camera lens assembly.

BACKGROUND

In cinematography it is common to combine computer generated graphics with live-action footage. For example, the live-action footage may be shot against a monochrome screen for a chroma key compositing process. To enable post-production effects artists to be able to position virtual objects correctly relative to the live-action footage requires knowledge of the motion and orientation of the camera system relative to the filmed scene (known as "motion tracking"), as well as requiring knowledge of the optical settings of the cinema camera lens assembly (commonly referred to as the "lens") that were used during the filming. With this knowledge, a 3D virtual scene can be viewed as a 2D projection from the standpoint of a virtual camera that follows a path corresponding to the path that the camera took in filming the live-action footage. This enables virtual objects to be viewed on the correct 2D projection for insertion into the live footage with the correct perspective, scale, orientation and motion, relative to the objects that are shown in the live-action footage.

Knowledge of the optical settings of the lens is commonly available, since a cinema camera system typically records the optical settings of the lens assembly corresponding with each frame of the recorded live footage, e.g. recording the zoom length, focal distance, and the aperture of the diaphragm iris.

Knowledge of the position and orientation of the camera system relative to the live-action that was filmed is not so easily available. Whilst in some cases, it is known to move the camera system along a pre-planned route, or to use a receiver on the camera system to detect the position of the camera system relative to an arrangement of ultrasonic or infrared transmitters or retroreflectors pre-positioned on the film set, such approaches are unattractive during filming. Rather, the 2D recorded images in a sequence of frames are commonly analysed in post-production to construct a 3D image of easily identifiable objects ("tracking markers") and to determine the relative location and movement of the camera system. However, where the filmed scene lacks clearly identifiable features, such as distinct points and edges that are fixed within the scene, such a procedure is difficult to automate, or in some cases the calculation may not be possible, requiring the movement and orientation of the camera system to be estimated based on the starting and end positions, which is accordingly time consuming and/or lacking in precision.

SUMMARY OF THE DISCLOSURE

According to a first aspect, there is provided a camera lens assembly comprising a lens assembly housing and a compound lens and a motion sensor arrangement preferably located within the lens assembly housing, but which could be situated within the camera or other equipment relating to production, wherein the motion sensor arrangement comprises: angular rotation sensors configured to detect angular rotation about three orthogonal axes of rotation; and linear acceleration sensors configured to detect linear acceleration in three orthogonal directions.

According to second aspect there is provided a method of tracking the motion of a camera lens assembly comprising a lens assembly housing and a compound lens and a motion sensor arrangement preferably located within the lens assembly housing, wherein the motion sensor arrangement comprises: angular rotation sensors configured to detect angular rotation about three orthogonal axes of rotation; and linear acceleration sensors configured to detect linear acceleration in three orthogonal directions, the method comprising: connecting the camera lens assembly to a camera body having a camera body clock; detecting signals from the sensors in correspondence with a control signal received from the camera body and recording data corresponding with the detected signals; receiving a synchronisation signal from the camera body having a time-stamp from the camera body clock and recording correlation data corresponding to a correlation between the camera body clock and a lens assembly clock; analysing a plurality of film frames to determine the position, motion and orientation of the lens assembly during the filming of a first frame; and determining the motion and orientation of the lens assembly during the filming of further film frames based upon the recorded data.

The lens assembly may comprise a no-parallax point and the motion sensor arrangement may be proximate the no-parallax point, or the lens assembly may comprise a range of no-parallax points and the motion sensor arrangement may be proximate the mid-point of the range of no-parallax points.

The motion sensor arrangement may be axially displaced from the no-parallax point or the mid-point of the range of no-parallax points by no more than ±10% of axial length of the compound lens.

The lens assembly may comprise a mount configured to detachably connect to a camera body and a non-rotating part configured not to rotate relative to the mount, wherein the non-rotating part comprises the motion sensor arrangement.

The motion sensor arrangement may be provided on a circuit board that has an annular shape or the shape of part of an annulus that curves about the light path through the lens assembly.

The lens assembly may comprise optical setting sensors.

The lens assembly may have a control circuit comprising or connected to the sensors, a lens assembly clock, and a data storage device, and the control circuit may be configured to detect signals from the sensors and the data storage device may be configured to record the detected signals with a corresponding time-stamp from the lens assembly clock.

The lens assembly may comprise a no-parallax point or a range of no-parallax points, and the data storage device may comprise calibration data corresponding to the relative orientation and relative physical locations of the motion sensor arrangement and the no-parallax point or range of no-parallax points.

The lens assembly may be configured to detect signals from the sensors in correspondence with a control signal received from a camera body connected to the camera lens assembly.

The lens assembly may be configured to connect to a camera body having a camera body clock, to receive a synchronisation signal from the camera body having a time-stamp from the camera body clock, and to record correlation data in the data storage device corresponding to a correlation between the camera body clock and the lens assembly clock.

The control circuit may be configured to transmit a stream of data from the data storage device.

The motion sensor arrangement may comprise one or more sensors selected from the group consisting of: a magnetometer; a barometer; and, a global positioning system.

The lens assembly may be a cinema camera lens assembly configured to mount onto a cinema camera body.

BRIEF DESCRIPTION OF THE DRAWINGS

Embodiments of the invention are further described hereinafter with reference to the accompanying drawings, in which.

DETAILED DESCRIPTION

Figure 1A:
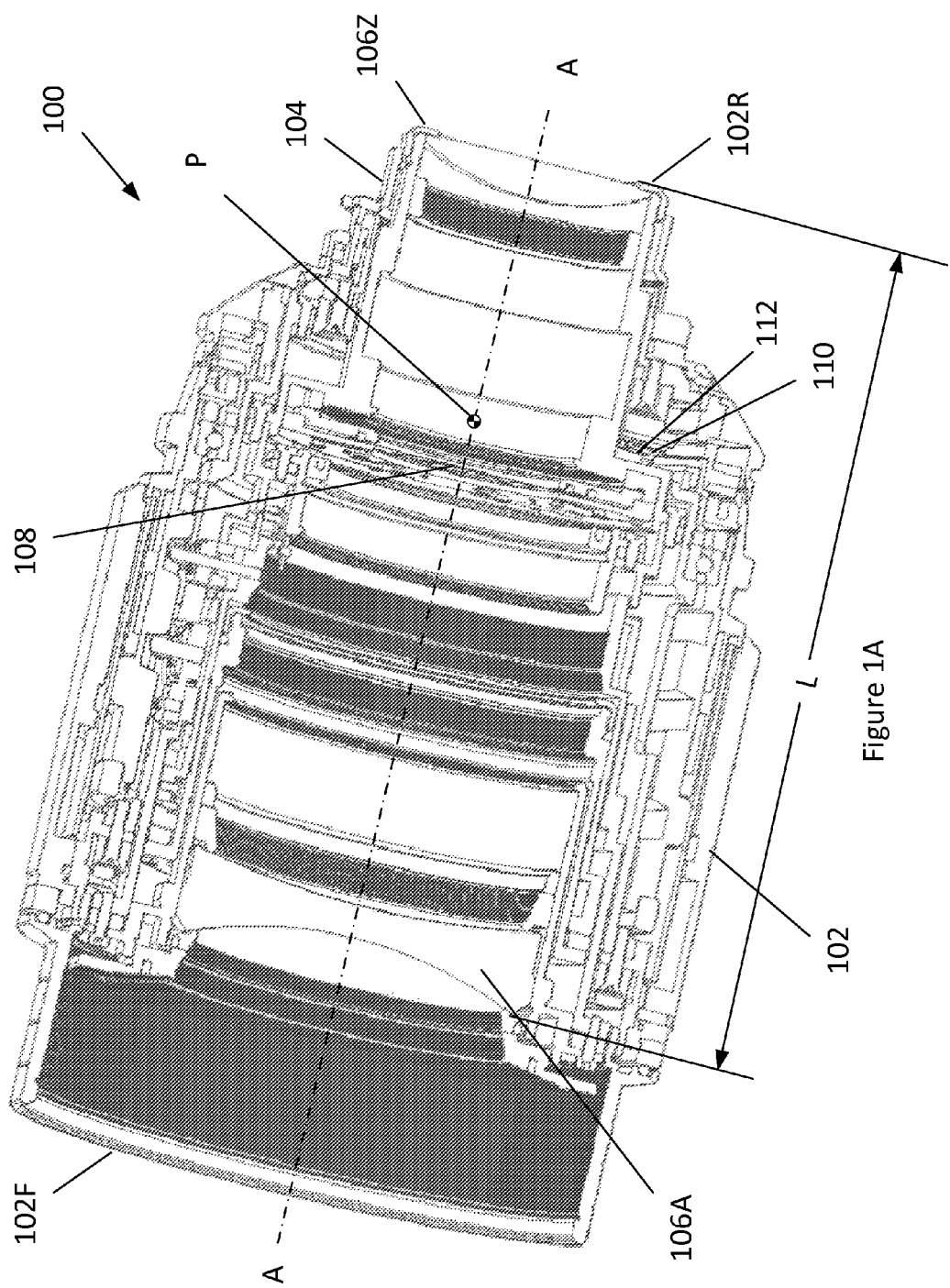
FIG. 1A shows a cut-away view of a cinema lens assembly.

Like reference numerals refer to like elements throughout.

FIG. 1A shows a cut-away view of a cinema camera lens assembly 100 having a lens assembly housing 102 with a mount 104 at one end 102R, which is configured for detachable connection to a cinema camera body (not shown). The lens assembly housing 102 is generally tubular and formed from several parts interconnected with screw threads or as sliding sleeves. The lens assembly housing 102 contains an array of simple lenses forming a compound lens along the optical axis A-A. For clarity only the simple lenses 106A and 106Z at the ends of the array are shown, and the intermediate simple lenses are omitted.

Within the lens assembly housing 102 and within the array of simple lenses 106A to 106Z there is an iris diaphragm 108, as is conventional in camera lenses.

The compound lens array has a length L along the optical axis A-A between the outer surfaces of the simple lenses 106A and 106Z, at opposite ends of the lens array of the compound lens. Within the compound lens of the illustrated lens assembly 100 there is an optical no-parallax point P (or, alternatively, in the case of a zoom lens, there is a range of no-parallax points corresponding to the range of focal lengths). The no-parallax point P is the point about which the lens assembly should be rotated to avoid parallax errors in the optical image formed at the image plane within the corresponding camera body. For a given lens assembly, the locations of the no-parallax point P may be determined by a conventional optical calibration procedure. The no-parallax point P is commonly close to the optical entrance pupil of the lens assembly 100, which is the apparent location of the iris 108 when viewed through the front end 102F of the lens assembly (which may be different to the physical location of the iris).

A control circuit 110 is also provided. Circuit 110 preferably comprises the motion sensors, a data storage device and a lens assembly clock. However, the motion sensors may be located in the camera or other equipment related with the production and be connected to the control circuit.

The sensors include a motion sensor arrangement that comprises angular rotation sensors configured to detect angular rotation about three orthogonal axes of rotation and linear acceleration sensors configured to detect linear acceleration in three orthogonal directions.

The control circuit 110 also comprises other sensors that detect optical settings of the lens assembly, e.g. focal depth, aperture (f-stop) size and the focal length (for a zoom lens).

Post-manufacture the precise physical relationship between the optical system (i.e. the lens assembly and the optical image sensor in the camera body) and the motion sensor arrangement is calibrated to determine the relative orientation and physical displacement (e.g. radially and axially, relative to the no-parallax point and optical axis) between them. The calibration data is stored on the data storage device. The data storage device is also configured to store data recorded from the motion sensors and optical setting sensors in the lens assembly, during use.

The lens assembly clock produces a lens time signal, and the data from the sensors is recorded with a time-stamp from the lens assembly clock.

Figure 1B:
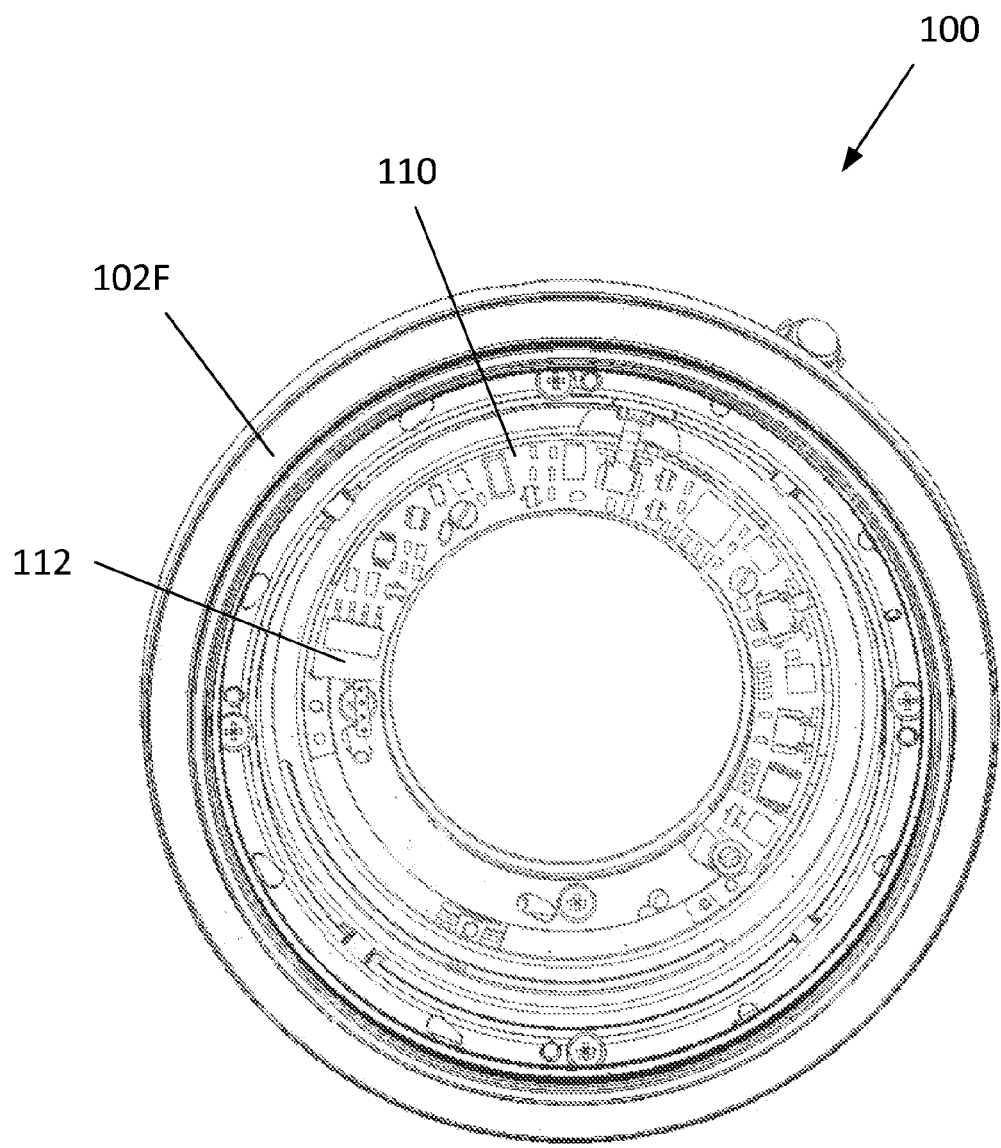
FIG. 1B shows a view into the end of the camera lens assembly housing of the cinema lens assembly of FIG. 1A.
Figure 1C:
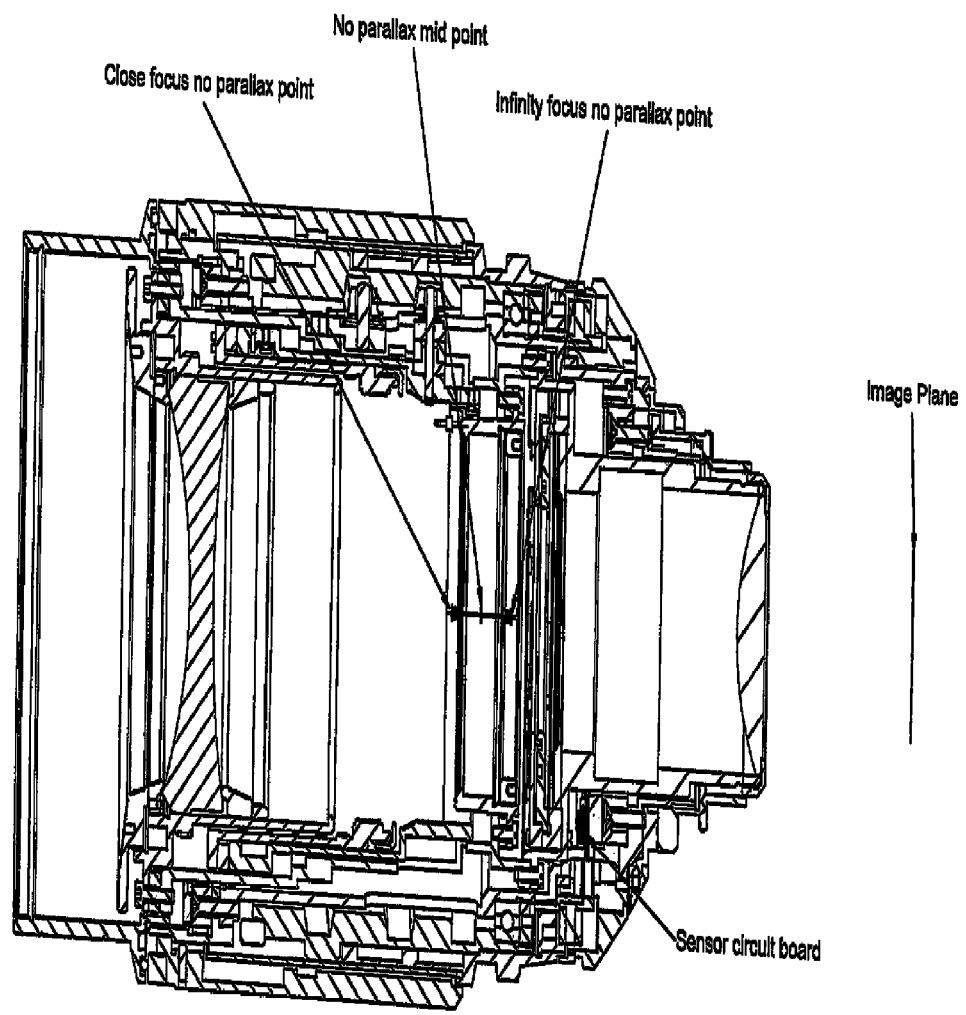
FIG. 1C shows a cross-sectional view of the cinema lens assembly of FIG. 1A.

If the motion sensors are located on the circuit board 110 it is preferable that they are mounted close to the optical axis A-A of the lens assembly 100, within the lens assembly housing 102. This reduces complexity during post-manufacture calibration, as well as reducing the correction errors arising in use. The motion sensors may be provided on a circuit board 112 that has an annular shape (or has the shape of part of an annulus, i.e. an incomplete ring), curving about the light path through the lens, as is more clearly illustrated in FIG. 1B, which shows a view into an end of the camera lens assembly housing with the iris diaphragm fully open (in the absence of all of the simple lens elements, for clarity). The annular shape of the circuit board 110 enables the motion sensors to be mounted close to the optical axis A-A.

Along the optical axis A-A of the lens assembly 100, the motion sensors are positioned close to the no-parallax point P (or close to the mid-point of the range of no-parallax points, in the case of a zoom lens), which reduces complexity during post-manufacture calibration, as well as reducing the correction errors arising in use. In particular, the motion sensors may be positioned within ±10% of axial length L of the compound lens from the no-parallax point P (or within ±10% of the median axial length L of the compound lens from the mid-point of the range of no-parallax points, e.g. in the case of a zoom lens assembly). For lens assemblies in which the no-parallax point P (or mid-point of the range of no-parallax points) is close to the iris 108, the annular shape of the circuit board 112 on which the motions sensors are mounted enables the motion sensors to be mounted even closer to the optical axis A-A of the lens assembly 100, as the light path through the lens narrows at the iris.

The motion sensors are mounted within a part of the lens assembly housing 102, the camera or other equipment that remains fixed to the mount 104, when the lens assembly is in use. Accordingly, the readings from the motion sensors correspond with changes in the motion and orientation of lens assembly 100 and the image recorded through the lens assembly by the camera body.

In use, during filming, the angular rotation sensors detect rotational movement of the lens arrangement relative to a three orthogonal axes of rotation, and the linear acceleration sensors detect changes in the linear movement of the lens arrangement relative to three orthogonal axes.

During filming, the cinema camera body communicates with the lens assembly 100, e.g. through an electrical interface (not shown) on the mount 104 or by wireless communication. The lens assembly receives control and synchronisation signals from the cinema camera body, e.g. signals indicating the beginning and end of live-action filming, periodic synchronisation signals, and/or when each film frame is recorded, which are time-stamped with the camera body time by the camera body internal clock. In use, the control circuit 110 repeatedly interrogates the sensors (i.e. the motion sensor arrangement and the optical setting sensors) and the lens assembly clock, e.g. at a much higher repetition rate than the frame rate of the film. The signals detected from the sensors are time-stamped with the lens assembly time from the lens assembly clock and recorded by the data storage device. Additionally, correspondence data recording the correspondence between the body clock time and lens assembly time is recorded by the data storage device. When the recorded data is subsequently analysed, the correspondence between the body clock time and lens assembly time (which may drift relative to one another) enables the data recorded from the motion sensors and the optical setting sensors to be accurately correlated with the filmed live-action footage, e.g. with an accuracy of a few milliseconds.

During post-production film processing, if there should be any portion of the footage during which it is difficult or impossible to determine the motion and orientation of the camera system relative to the filmed scene, this information can then be calculated from the data recorded by the lens assembly. For example: (i) immediately before and after a portion of footage in which the motion and orientation of the camera system is unknown, the linear and rotational movement of the camera system (relative to the no-parallax point) may be determined from analysis of film; then (ii) based on the linear acceleration and rotational motion data from the motion sensor arrangement, the motion and orientation of the camera system, relative to the no-parallax point P, during the intervening period may be determined to complete the record. Accordingly, with this knowledge, a 3D virtual scene can be viewed along the correct 2D projection for determining the appearance of the 3D scene to match the live-action footage. Further, the information provided by the motion sensor arrangement may also be used to supplement information derived from the recorded image. The data recorded from optical setting sensors (e.g. focal length, focus and aperture) may be used to assist with interpreting the recorded footage.

Accurate matching of the positions of virtual objects relative to live-action footage requires accurate tracking of the motion and orientation of the camera system. Provision of the motion sensors within the lens assembly housing (e.g. closer to the optical axis and the no-parallax point of the lens assembly) reduces the risk of coupling between orientation errors and position errors during post-production work. Further, providing the motion sensors within the housing minimises the risk of inaccuracies arising due to mechanical flexure of the camera system. Accordingly, the present lens assembly may enable post-production reconstruction of the motion and orientation of the lens assembly with a high degree of accuracy (e.g. with orientation accuracy of a few thousandths of a degree), thus enabling highly accurate calculation of the correct positions for virtual objects, relative to the live-action footage.

The control circuit 110 interrogates the motion sensor arrangement with a high frequency, which enables the linear acceleration and rotational motion of the lens assembly to be determined with a high degree of accuracy.

The control circuit of the illustrated lens assembly may additionally comprise further sensors including magnetometers, a global positioning system and/or a barometer. The magnetometers may provide a signal indicating the orientation of the lens assembly relative to the earth's magnetic field (or an artificial magnetic field). The GPS maps the latitude and longitude of the lens assembly, which may enable the angle of incident sunlight in the live-action footage to be determined. A sensitive barometer may provide a way to determine the altitude of the lens assembly, which may further assist with determining the movement of the camera system.

Although described with regard to post-production use, the signals recorded from the motion sensors may also be used to support real-time estimation of the orientation and position of the lens assembly during filming, for the real-time combining of computer generated graphics with live-action footage The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A camera lens assembly comprising a lens assembly housing, a compound lens, angular rotation sensors configured to detect angular rotation and to generate a detect signal when angular rotation is detected, linear acceleration sensors configured to detect linear acceleration and to generate a detect signal when linear acceleration is detected, a control circuit comprising a lens assembly clock generating a lens time signal and a data storage device, wherein said control circuit is connected to receive said detect signals from said sensors and wherein said data storage device is connected to record said detected signals and a corresponding time-stamp based on said lens time signal from said lens assembly clock.

2. A camera lens assembly according to claim 1, wherein the lens assembly comprises a no-parallax point and the sensors are located proximate the no-parallax point.

3. A camera lens assembly according to claim 1, wherein the lens assembly comprises a mount configured to detachably connect to a camera body and a non-rotating part configured not to rotate relative to the mount, wherein the non-rotating part comprises the sensors.

4. A camera lens assembly according to claim 1, wherein the sensors are provided on a circuit board that has an annular shape.

5. A camera lens assembly according to claim 1, wherein the lens assembly comprises optical setting sensors.

6. A camera lens assembly according to claim 1, wherein the lens assembly comprises a no-parallax point or a range of no-parallax points, and the data storage device comprises calibration data corresponding to the relative orientation and relative physical locations of the sensors and the no-parallax point or range of no-parallax points.

7. A camera lens assembly according claim 1, wherein the lens assembly is configured to detect signals from the sensors in correspondence with a control signal received from a camera body connected to the camera lens assembly.

8. A camera lens assembly according to claim 1, wherein the lens assembly is configured to connect to a camera body having a camera body clock, to receive a synchronization signal from the camera body having a time-stamp from the camera body clock, and to record correlation data in the data storage device corresponding to a correlation between the camera body clock and the lens assembly clock.

9. A camera lens assembly according to claim 1, wherein the control circuit is configured to transmit a stream of data from the data storage device.

10. A camera lens assembly according to claim 1, wherein the sensors comprise one or more sensors selected from the group consisting of: a magnetometer; a barometer; and a global positioning system.

11. A camera lens assembly according to claim 1, wherein the lens assembly is a cinema camera lens assembly configured to mount onto a cinema camera body.

12. A camera lens assembly according to claim 1, wherein the lens assembly comprises a range of no-parallax points and the sensors are located the mid-point of the range of no-parallax points.

13. A camera lens assembly according to claim 1, wherein the sensors are provided on a circuit board that has the shape of part of an annulus that curves about the light path through the lens assembly.

14. A method of tracking the motion of a camera lens assembly for use with a camera body having a camera body clock, said camera body being capable of generating a control signal and a synchronization signal including time-stamp information from the camera body clock, said camera lens assembly including angular rotation sensors adapted to generate a signal when angular rotation is detected, linear acceleration sensors adapted to generate a signal when linear acceleration is detected, a lens assembly clock for generating a lens time signal and a data storage device, the method comprising the steps of:
   connecting the camera lens assembly to a camera body;
   detecting signals from the sensors in response to a control signal received from the camera body and recording data corresponding with the detected signals in the data storage device;
   receiving a synchronization signal from the camera body having a time-stamp from the camera body clock and recording data corresponding to a correlation between the camera body clock and a lens assembly clock in the data storage device;
   analyzing a plurality of film frames to determine the position, motion and orientation of the lens assembly during the filming of a first frame; and
   determining the motion and orientation of the lens assembly during the filming of further film frames based upon the recorded data in the data storage device.

15. A method of tracking the motion of a camera assembly comprising a lens assembly for use with a camera body having a camera body clock, said camera body being capable of generating a control signal and a synchronization signal including time-stamp information from the camera body clock, said camera lens assembly including angular rotation sensors adapted to generate a signal when angular rotation is detected, linear acceleration sensors adapted to generate a signal when linear acceleration is detected, a lens assembly clock for generating a lens time signal and a data storage device, the method comprising the steps of:
   connecting the camera lens assembly to a camera body;
   detecting signals from the sensors in response to a control signal received from the camera body and recording data corresponding with the detected signals in the data storage device;
   receiving a synchronization signal from the camera body having a time-stamp from the camera body clock and recording data corresponding to a correlation between the camera body clock and a lens assembly clock in the data storage device;
   analyzing a plurality of film frames to determine the position, motion and orientation of the lens assembly during the filming of a first frame; and
   determining the motion and orientation of the lens assembly during the filming of further film frames based upon the recorded data in the data storage device.

* * * * *